United States Patent
Degroot et al.

(10) Patent No.: US 11,787,639 B2
(45) Date of Patent: Oct. 17, 2023

(54) POSITION LIMITER FOR FLIGHTED CONVEYOR BELT

(71) Applicant: Laitram, L.L.C., Harahan, LA (US)

(72) Inventors: Michael Hendrik Degroot, Rockford, MI (US); Drew Downer, Caledonia, MI (US); Gerko Hulshof, Aalten (NL); Jake A. Mohan, Grand Rapids, MI (US)

(73) Assignee: Laitram L.L.C., Harahan, LA (US)

( * ) Notice: Subject to any disclaimer, the term of this patent is extended or adjusted under 35 U.S.C. 154(b) by 15 days.

(21) Appl. No.: 17/563,464

(22) Filed: Dec. 28, 2021

(65) Prior Publication Data

US 2022/0119200 A1    Apr. 21, 2022

Related U.S. Application Data

(63) Continuation of application No. 16/977,930, filed as application No. PCT/US2019/023345 on Mar. 21, 2019, now Pat. No. 11,214,446.

(Continued)

(51) Int. Cl.
*B65G 39/12* (2006.01)
*B65G 45/12* (2006.01)
(Continued)

(52) U.S. Cl.
CPC ............ *B65G 39/12* (2013.01); *B65G 15/60* (2013.01); *B65G 21/06* (2013.01); *B65G 23/12* (2013.01); *B65G 2812/02168* (2013.01)

(58) Field of Classification Search
CPC ........ B65G 15/60; B65G 15/64; B65G 39/12; B65G 45/12; B65G 45/16; B65G 21/06; B65G 23/12
(Continued)

(56) References Cited

U.S. PATENT DOCUMENTS

| 5,950,803 A | 9/1999 | Schwarze |
| 7,850,562 B2 | 12/2010 | DeGroot |

(Continued)

FOREIGN PATENT DOCUMENTS

| JP | 47-003931 Y | 2/1972 |
| JP | 53-20789 U | 2/1978 |

(Continued)

OTHER PUBLICATIONS

First Office Action, Chinese Patent Application No. 2019800130152, dated Jul. 7, 2021, China National Intellectual Property Administration.

(Continued)

*Primary Examiner* — Douglas A Hess
(74) *Attorney, Agent, or Firm* — Catherine M. Bishop

(57) ABSTRACT

A conveyor employs an assembly at a drive end having a position limiter assembly configured to accommodate flights in a conveyor belt while ensuring proper engagement between the conveyor belt and a drive. The end assembly includes opposing end plates, a drive extending between the end plates and a position limiter assembly extending between the end plates below the drive for ensuring proper engagement of a conveyor belt with the drive. The position limiter comprises a series of spaced apart rollers mounted to and spaced from a mounting bar extending between the end plates. Roller mounting arms connect the rollers to the mounting bars.

14 Claims, 9 Drawing Sheets

Related U.S. Application Data

(60) Provisional application No. 62/646,478, filed on Mar. 22, 2018.

(51) Int. Cl.
*B65G 15/60* (2006.01)
*B65G 21/06* (2006.01)
*B65G 23/12* (2006.01)

(58) Field of Classification Search
USPC .............. 193/37 R; 198/497, 498, 499, 860.1
See application file for complete search history.

(56) References Cited

U.S. PATENT DOCUMENTS

| | | | |
|---|---|---|---|
| 8,936,147 B2 | 1/2015 | Knas et al. | |
| 9,296,565 B2 | 3/2016 | Batchelder et al. | |
| 9,555,971 B2 | 1/2017 | Batchelder et al. | |
| 9,771,221 B2 | 9/2017 | Kawanami et al. | |
| 9,840,374 B2 * | 12/2017 | Ma | B65G 45/16 |
| 10,035,656 B2 | 7/2018 | DeGroot et al. | |
| 10,077,156 B2 | 9/2018 | Fourney et al. | |
| 10,280,010 B2 * | 5/2019 | Olmstead | B65G 45/16 |
| 10,695,481 B2 | 6/2020 | Kelly et al. | |
| 10,696,481 B2 | 6/2020 | Batchelder et al. | |
| 10,836,581 B2 | 11/2020 | DeGroot et al. | |
| 11,214,446 B2 * | 1/2022 | Degroot | B65G 15/60 |
| 11,332,318 B2 * | 5/2022 | DeGroot | B65G 21/06 |
| 2017/0158434 A1 | 6/2017 | Fourney et al. | |
| 2017/0362034 A1 | 12/2017 | DeGroot et al. | |
| 2022/0250854 A1 * | 8/2022 | Degroot et al. | |

FOREIGN PATENT DOCUMENTS

| | | |
|---|---|---|
| JP | 2005-330100 A | 12/2005 |
| JP | 2017510522 A | 4/2017 |
| JP | 3210894 | 6/2017 |
| KR | 10-0822414 B1 | 4/2008 |
| KR | 10-2009-0111924 A | 10/2009 |
| WO | 2017205135 A1 | 11/2017 |

OTHER PUBLICATIONS

Extended European Search Report, European Patent Application No. EP19771821, dated Nov. 15, 2021, European Patent Office, Munich, Germany.

Notice of Reasons for Refusal, Japanese Patent Application No. 2020-545274, dated Feb. 14, 2023, Japanese Patent Office.

* cited by examiner

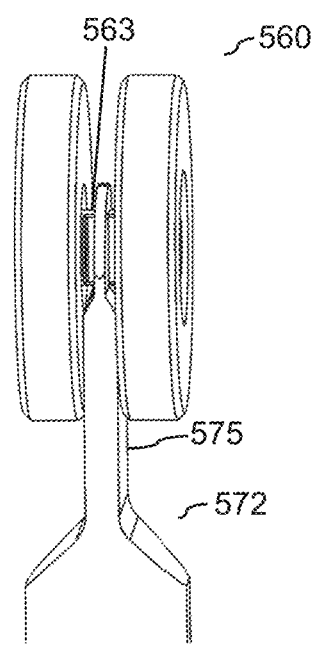
FIG. 22
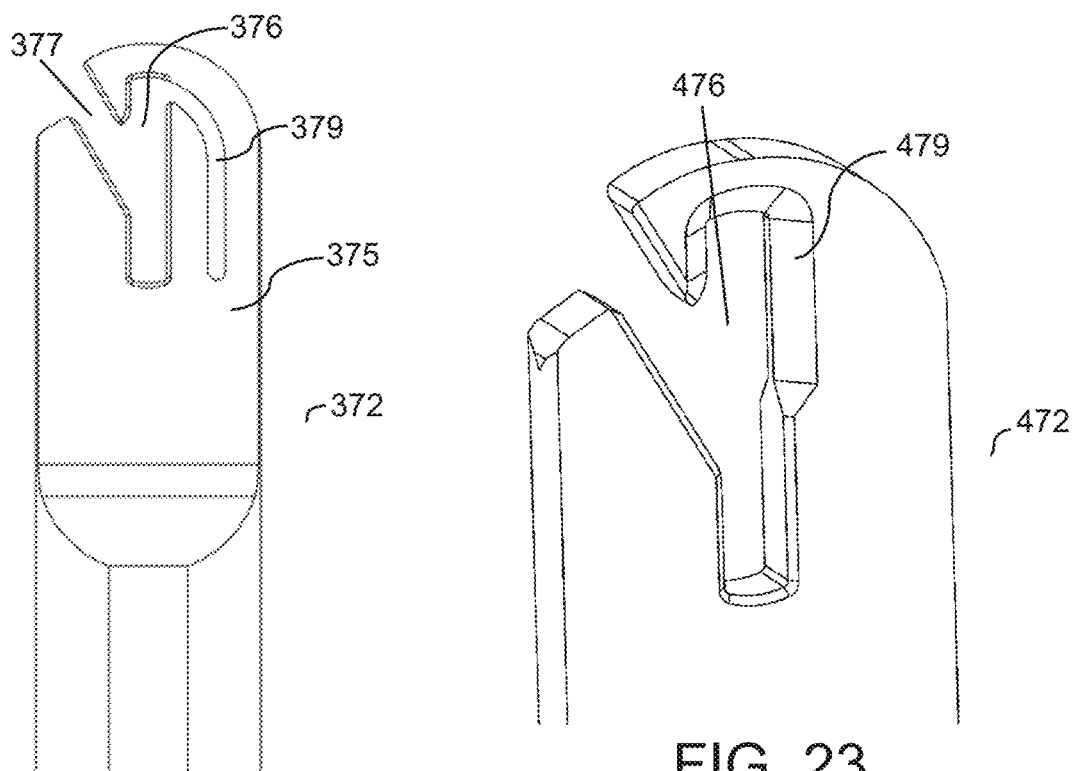
FIG. 23
FIG. 24
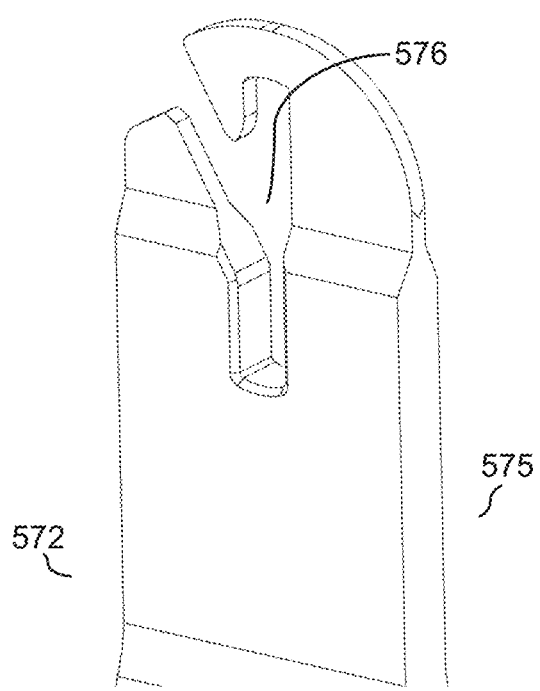
FIG. 25

POSITION LIMITER FOR FLIGHTED CONVEYOR BELT

RELATED APPLICATIONS

This application is a continuation of U.S. patent application Ser. No. 16/977,930, which is a 371 of PCT/US2019/023345, which claims priority to U.S. Provisional Patent Application No. 62/646,478 filed Mar. 22, 2018, and entitled "Position Limiter for Flighted Conveyor Belt", the contents of which are herein incorporated by reference.

FIELD OF THE INVENTION

The present invention relates to power-driven conveyors. More particularly, the invention relates to infeed and outfeed assemblies for a conveyor to transition conveyed items onto and off of the conveyor and position limiters for ensuring proper engagement between a conveyor belt and a drive.

BACKGROUND OF THE INVENTION

Power-driven conveyors are used to convey items. Position limiters, such as described in U.S. Pat. No. 7,850,562, the contents of which are incorporated herein by reference, are used in low tension, positive drive belting systems to ensure proper engagement of the belt and drive sprocket by controlling the position of the belt during the drive tooth hand-off process. A position limiter may be disposed against the belt near the exit point. Examples of position limiters include scrapers, rollers and shoes.

Current position limiters are fixed to a mounting shaft, which may trap dirt and debris and inhibit disassembly and-or replacement of the position limiter. In addition, current position limiters are generally placed where the conveyor belt would naturally fall away from the drive sprocket when no pretension is applied, which is typically at 165° of wrap from where the belt enters the drive sprocket. The position limiter thus competes for the same space as a belt scraper, if used. Further, the position limiter must be axially aligned with the drive sprockets, requiring locking collars or fasteners that can become harborage zones for bacteria, thus presenting risks to food safety. In addition, conveyor belts with flights make use of a position limiter difficult.

SUMMARY OF THE INVENTION

An end assembly for a conveyor comprises opposing end plates, a drive extending between the end plates and a position limiter assembly extending between the end plates below the drive for ensuring proper engagement of a conveyor belt with the drive. The position limiter comprises a series of spaced apart rollers mounted to and spaced from a mounting bar extending between the end plates.

According to one aspect, a conveyor comprises a frame including opposing end plates at an end of the conveyor, each end plate including an upper opening for mounting a drive shaft and a lower opening comprising a receptacle for mounting a position limiter assembly and a position limiter assembly mounted in the frame. The position limiter assembly comprises a mounting bar extending from a first end to a second end, a plurality of rollers mounted to a plurality of roller mounting arms extending from the mounting bar and a mounting portion for mounting the mounting bar between the end plates.

According to another aspect, a position limiter assembly for a conveyor comprises a mounting bar extending from a first end to a second end, a first assembly mounting arm extending up from a top of the mounting bar at the first end, a mounting portion for mounting the mounting bar to a conveyor frame and a plurality of rollers mounted to and spaced from the mounting bar at select intervals along the length of the mounting bar.

According to another aspect, a mounting arm for a position limiter assembly comprises a base, a first end for connecting the mounting arm to a mounting bar and a slotted second end for receiving a roller forming a position limiter, the slotted second end including an operation slot and an open installation slot intersecting the operation slot at an angle.

BRIEF DESCRIPTION OF THE FIGURES

FIG. 22 is a side view of an end portion of a mounting arm for a position limiter assembly including a relief slot according to another embodiment of the invention;

FIG. 23 is an isometric view of an end portion of a mounting arm for a position limiter assembly including cleaning chamfers, according to another embodiment of the invention;

FIG. 24 is a front view of a roller and mounting arm for a position limiter assembly according to another embodiment of the invention;

FIG. 25 shows the end portion of the mounting arm of FIG. 24.

DETAILED DESCRIPTION OF THE INVENTION

A conveyor system includes a position limiter assembly for ensuring proper engagement between drive elements on a conveyor belt and a drive that can accommodate flights in the conveyor belt. The invention will be described below relative to certain illustrative embodiments, though the invention is not limited to the illustrative embodiments.

Figure 1:
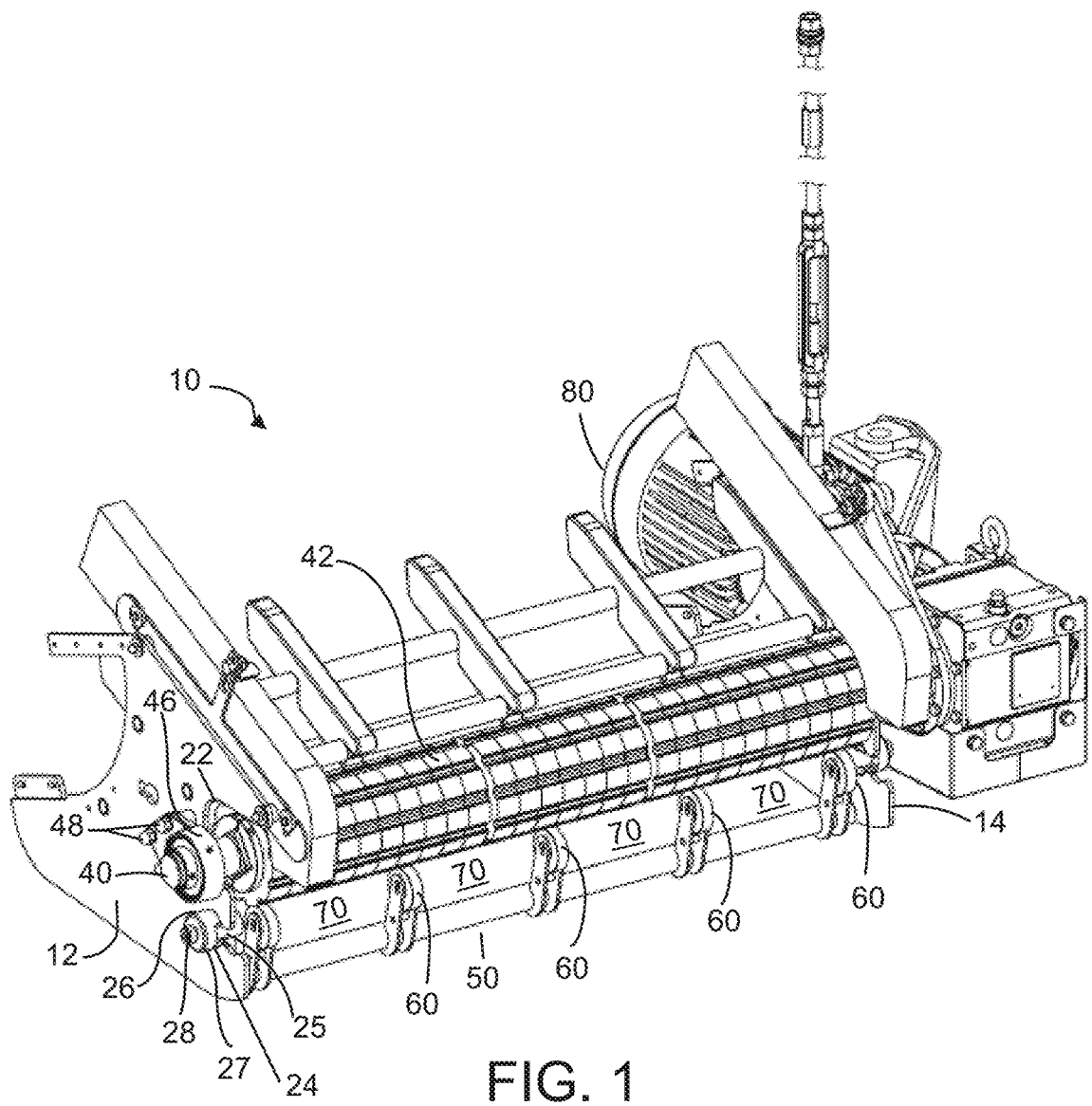
FIG. 1 is an isometric view of a drive end of a low-tension, direct drive conveyor belt system including a position limiter assembly designed to accommodate flights in a conveyor belt.

FIG. 1 illustrates a portion of a drive end of a low-tension, direct drive conveyor belt system including a position limiter assembly 50 including roller limiters 60 forming spaces 70 therebetween for accommodating flights in a conveyor belt according to one embodiment of the invention. The illustrative drive end assembly 10 includes a pair of spaced apart, opposing end plates 12, 14 for mounting various components and forming a drive end of a conveyor. Each end plate includes an upper opening 22, shown as an open recess, for receiving a drive shaft 40, on which a full-width sprocket 42 or other conveyor drive is mounted. A motor 80 or other means drives the sprocket 42. The drive shaft is mounted in a bearing 46 at each end. Each bearing may be integrated into the opening 22, or may be attached to an end plate 12, 14 using fasteners 48, as shown.

A lower opening 24 in each end plate mounts the position limiter assembly 50. The position limiter assembly ensures proper engagement between a conveyor belt and the drive for the conveyor belt. The illustrative position limiter assembly 50, shown in FIG. 2, has a mounting portion for mounting the comprises a mounting bar 52 extending from a first end 521 to a second end 522. A mounting portion mounts the mounting bar 52 between the end plates 12, 14 in a selected position. The illustrative mounting portion comprises assembly mounting arms 54 extending up from each end of the mounting bar for mounting the position limiter assembly 50 to the end plates 12, 14. The illustrative mounting arms 54 comprise a vertical neck portion 55 extending from the top of the mounting bar 52 and a head 56 at the end of the neck. The head 56 comprises a cylindrical base 57 connected to the neck 55 and a narrowed boss 58 having an opening 59 in an end face thereof. The illustrative opening 59 is offset from the central axis of the head. 56. The bosses 58 extend outward from the cylindrical bases 57 for insertion in the lower opening 24 of the end plates 12, 14. The illustrative boss 58 has a flat top wall, flat bottom wall, rounded rear wall 584 and rounded front wall (as described below).

Referring back to FIG. 1, each lower opening 24 is configured to receive a head 56 of a position limiter assembly 50. The illustrative lower opening 24 comprises an open slot 25 extending to the front of the end plate and a receptacle 26 for receiving the boss 58. The illustrative receptacle 26 of FIG. 1 is cylindrical, but the receptacle can alternatively have flat sides or be otherwise shaped to accommodate the head 56 of a position limiter assembly. A central opening 27 receives a removable fastener 28 that extends into and is received in opening 59 in the head 56 to mate the position limiter assembly 50 with the end plate 12 and hold the position limiter assembly in an operating position.

The invention is not limited to the illustrative assembly mounting arms 54 for mounting the position limiter assembly 50 to the end plates 12, 14. In another embodiment of the invention, the end plates 12, 14 include lower openings that receive the mounting bar 52 directly or another protrusion from the mounting bar without using the mounting arms 54 and head 56. In such an embodiment, the lower opening 24 would be lower than the embodiment of FIG. 1. Any suitable means for mounting a position limiter assembly to a conveyor frame may be used.

Figure 2:
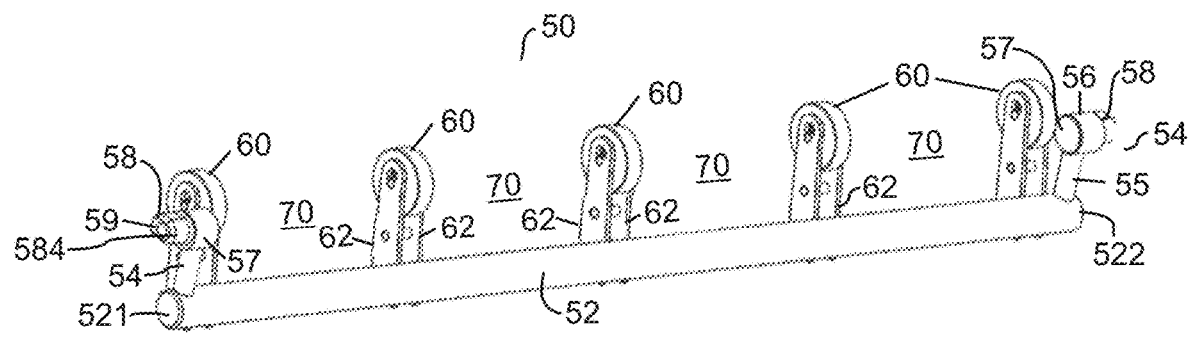
FIG. 2 is an isometric view of the position limiter assembly of the system of FIG. 1.
Figure 3:
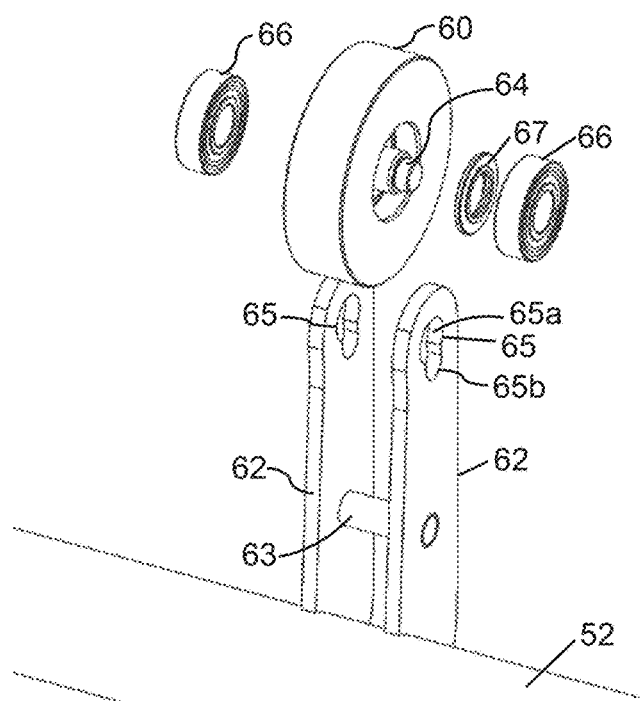
FIG. 3 is an exploded view of a roller in the position limiter assembly of FIG. 2.

Referring to FIGS. 2 and 3, the position limiter assembly 50 further includes a plurality of roller limiters mounted along the length of the mounting bar 52 at select intervals. The illustrative roller limiters comprise rollers 60 mounted to the mounting bar using roller mounting arms 62 that extend up from the front of the mounting bar. The rollers may be formed of plastic or another suitable material. When assembled, the rollers 60 are mounted close to the sprocket 42 to ensure engagement between a drive tooth and a drive element on the sprocket, as shown in FIG. 1. Each roller limiter comprises a pair of opposing mounting arms 62 welded or otherwise affixed to the front of the mounting bar 52, but the invention is not so limited. A support beam 63 can extend between each pair of roller mounting arms 62. The roller mounting arms 62 include keyhole-shaped openings 65 for mounting a roller axle 64. Each illustrative roller 60 includes a pair of bearings 66, a spacer 67 and the axle 64 press fit into the central opening of the roller portion 60, with the axle 64 protruding by slightly more than the thickness of a mounting arm 62 on each side. The keyhole-shaped opening 65 has a wider upper portion 65a for inserting the axle 64. In operation, the axle 64 rests in the smaller lower portion 65b, which prevents the roller 60 from escaping or moving out of position. The keyhole shape allows selective movement of the axle for cleaning. The opening 65 is not limited to the illustrative keyhole shape and may have any suitable size, shape and configuration that facilitates mounting of the rollers 60 while allowing selective movement of the rollers for cleaning or for another purpose.

Figure 4:
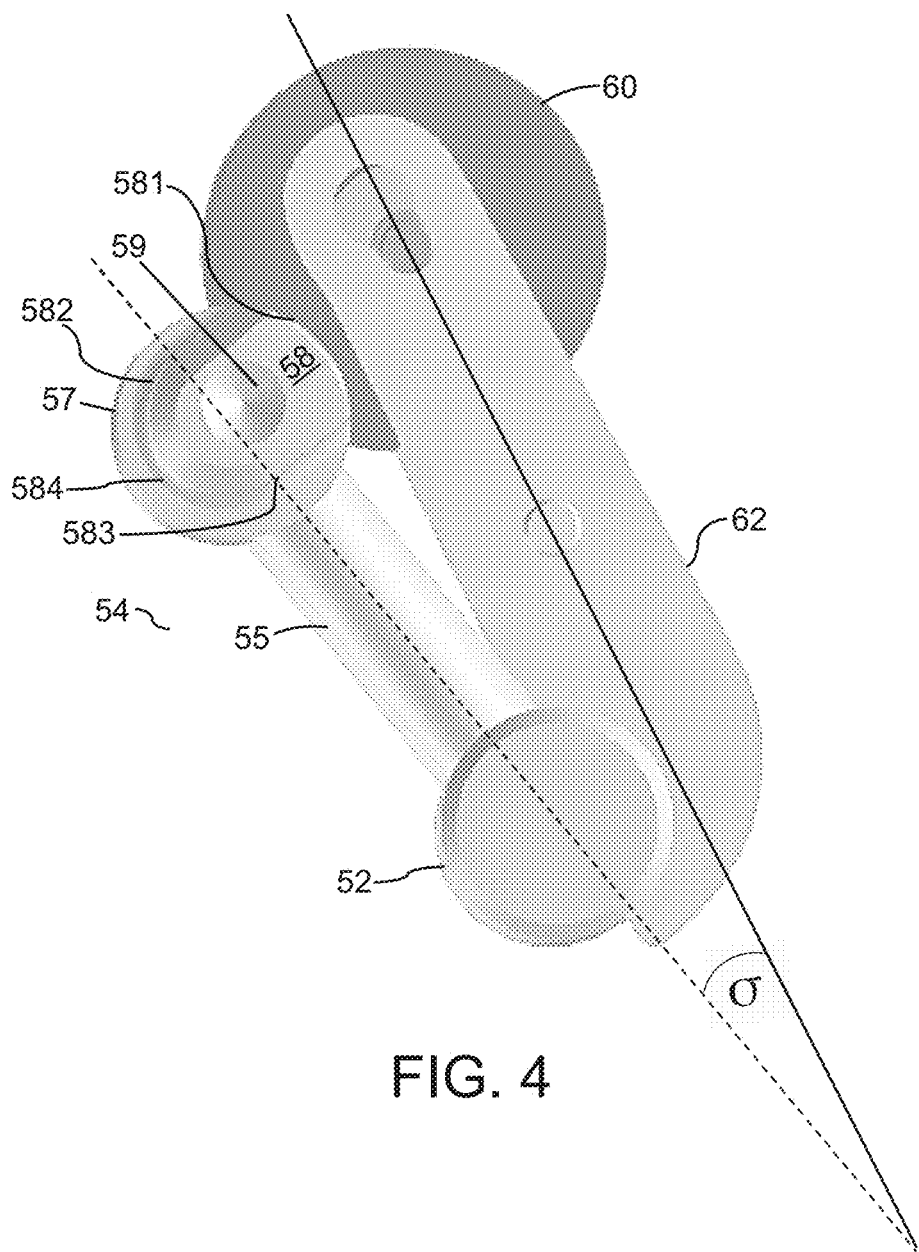
FIG. 4 is an end view of the position limiter assembly of FIG. 2
Figure 5:
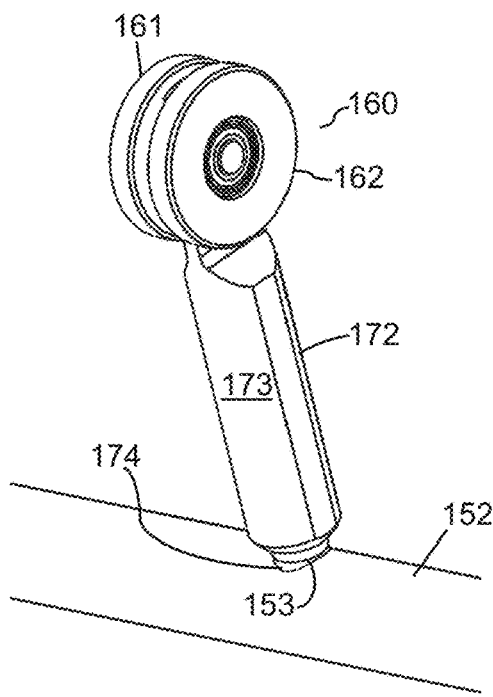
FIG. 5 is an isometric view of a roller limiter suitable for use in a position limiter assembly according to another embodiment of the invention.

The illustrative roller mounting arms 62 extend at an angle relative to the assembly mounting arms 54 at the ends of the mounting bar 52. For example, as shown in FIG. 4, the roller mounting arms 62 extend at an angle θ between about 10° and about 30°, and preferably between about 15° and about 25°, relative to the assembly mounting arms 54 and neck 55 of the mounting arm 54 to properly position the rollers 60 in the drive end assembly 10. As shown also in FIG. 4, in the illustrative embodiment, the front curved wall 581 of the boss 58 is coextensive with the cylindrical base 57, while the top flat wall 582, bottom flat wall 583 and rear curved wall 584 are smaller than or inset from the cylindrical base 57, forming a C-shaped shelf between the base 57 and boss 58.

The rollers 60 are spaced along the mounting bar 52 to accommodate flights in an associated conveyor belt as the sprocket drives the conveyor belt. For example, the illustrative position limiter assembly 50 includes a roller limiter assembly near each end 521 and 522, and three rollers spaced across the length of the mounting bar, designed to be placed in spaces between flights on the belt to contact or be placed close to the upper surface of the conveyor belt in those spaces. The flights can pass through the spaces 70 between the roller mounting arms and the mounting bar, while the roller 60 extend to the conveying surface to ensure proper engagement between the sprocket or other drive and the drive teeth of the conveyor belt.

FIGS. 5-8 show another embodiment of a position limiter assembly including a double wheel design, though the invention is not so limited. In the embodiment of FIGS. 5-8, each roller limiter 160 comprises a pair spaced-apart of rollers 161, 162 mounted on an axle 163 using bearings 164. The illustrative rollers are press fit onto the axle 163, though the invention is not so limited. A mounting arm 172 connects the rollers 161, 162 to a mounting bar 152. The illustrative mounting arm 172 includes a base portion 173, a threaded first end 174 for connecting the mounting arm 172 to the mounting bar 152 and a slotted second end 175 for mounting the roller limiter 160. The slotted second end 175 is thinner than the base 173 and extends between the rollers 161, 162 with the axle 163 extending through the slotted second end 175 to allow free rotation of the rollers 161, 162 during operation. The illustrative threaded first end 174 may be received in a corresponding opening 153 in the mounting bar 152, but other suitable means for mounting the rollers to the mounting bar of a position limiter assembly may be used.

Figure 6:
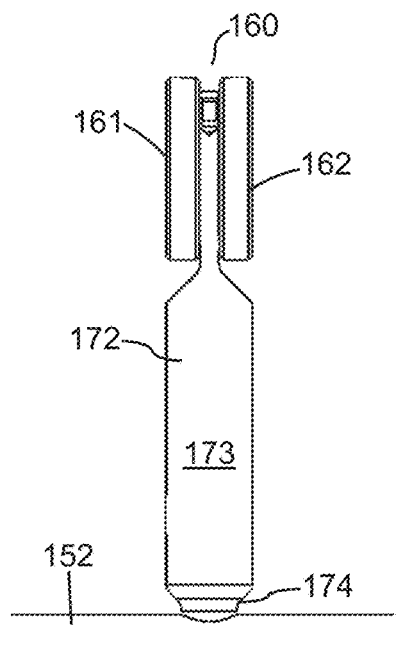
FIG. 6 is a front view of the roller limiter of FIG. 5.
Figure 7:
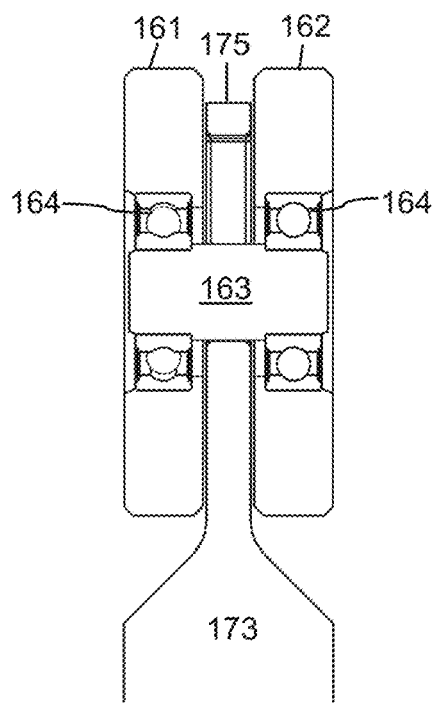
FIG. 7 is a cross-sectional view of the roller limiter of FIG. 5.
Figure 8:
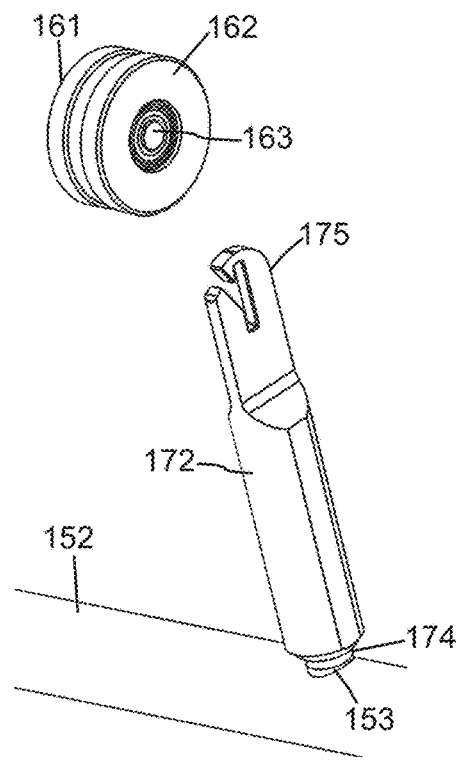
FIG. 8 is an exploded view of the roller limiter of FIG. 5 separated from the associated mounting arm.
Figure 9:
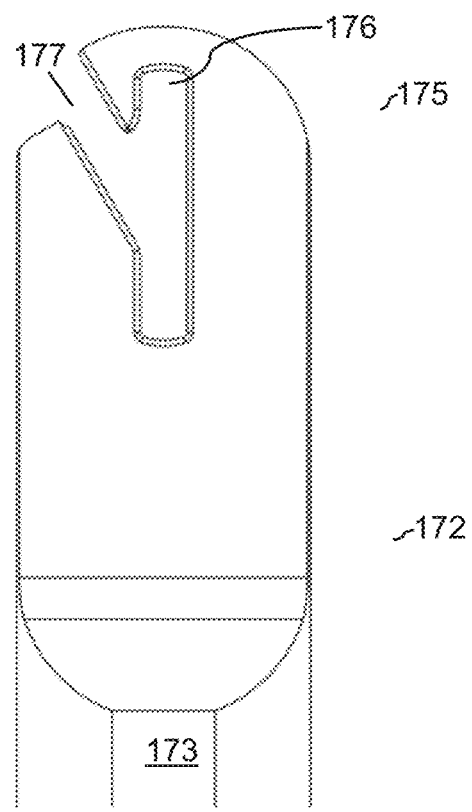
FIG. 9 is a side view of a mounting arm for a position limiter assembly according to an embodiment of the invention.

Referring to FIG. 9, the slotted second end 175 of the mounting bar 172 is configured to allow assembly and disassembly of the roller limiter 160 only when a user properly aligns the axle 163 and provides a required force. The illustrative slotted second end 175 has a tapered down thickness to fit between the two rollers 161, 162, as shown in FIGS. 6 and 7. The slotted second end 175 includes a first slot 176 and a second slot 177 that intersects the first slot at an angle and is open. The first slot 176 forms an operation slot for the axle and the second slot 177 forms an installation slot.

Figure 10:
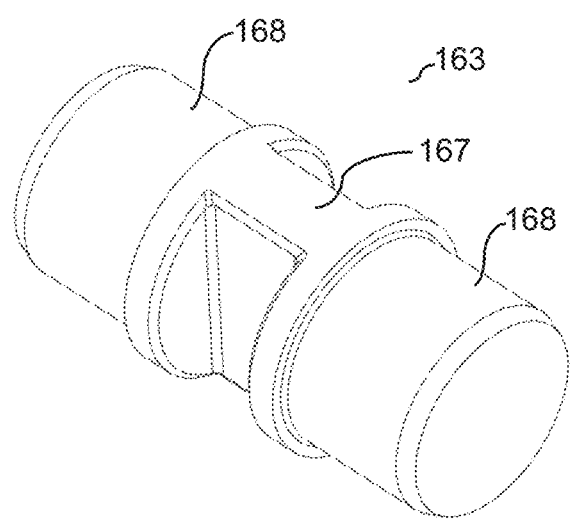
FIG. 10 is an isometric view of an axle suitable for mounting a roller in a position limiter assembly according to an embodiment of the invention.
Figure 11:
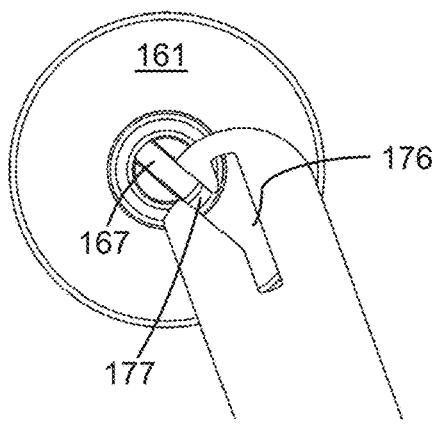
FIG. 11 is a side view of a portion of a roller oriented for mounting to a mounting arm of a position limiter assembly according to an embodiment of the invention.

FIG. 10 is an isometric view of the axle 163 on which the rollers 161 and 162 are mounted. The axle 163 includes a narrow central portion 167 having flat sides and roller mounting portions 168 that allow free rotation of the rollers 161, 162 about the axle 163.

Figure 12:
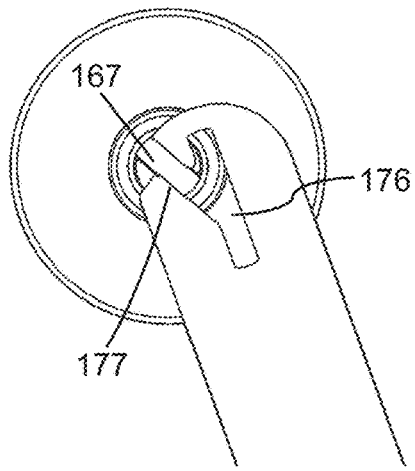
FIG. 12 shows the roller portion of FIG. 11 during initial insertion into the mounting arm.
Figure 13:
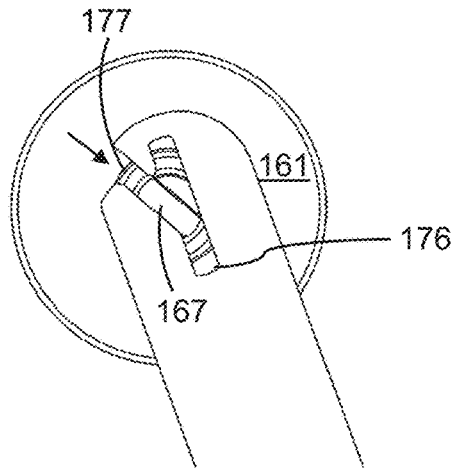
FIG. 13 shows the roller portion of FIG. 11 during insertion into the mounting arm.
Figure 14:
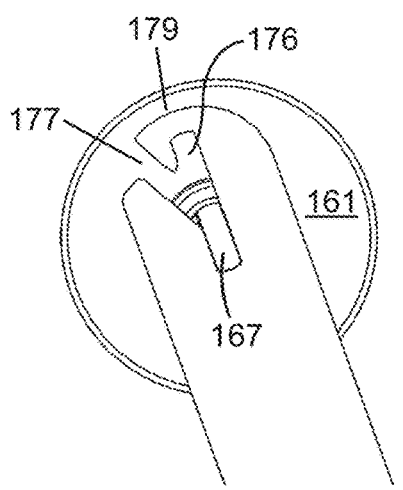
FIG. 14 shows the roller portion of FIG. 11 in an operating position.

FIGS. 11-15 show the process of mounting the double roller 160 on the mounting bar 172 according to an embodiment of the invention. FIGS. 11-15 show the double roller 160 with one roller removed in order to demonstrate insertion of the axle 163 into the slots 176, 177. To begin installation, FIG. 11, the double roller 160 is oriented so that the axle narrow central portion 167 between the rollers 161, 162 can enter the installation slot 177. In this orientation, a flat side of the axle narrow central portion 167 rests against or close to one or both walls of the installation slot 177. Then, the axle is pushed into the installation slot 177, as shown in FIG. 12. The illustrative installation slot 177 is sized to provide an interference fit with the axle narrow central portion, so that a user must provide a certain amount of force to cause the axle to slide inwards towards the operation slot 176, as show in FIG. 13. After clearing the interference zone formed by installation slot 177, the axle 163 rotates and falls into an operating position in the operation slot 176, as shown in FIG. 14. The illustrative configuration captures the axle 163 and prevents dismounting of the roller assembly 160 during operation, because the axle narrow central portion 167 cannot re-enter the installation slot 177 without proper alignment and significant removal force. In the operating position, the rollers 161 and 162 are fully supported and straddle the mounting arm 172, freely rotating about the axle 163. The slot 176 is sized such that the tip 179 of the second end of the mounting arm 172 does not reach the outer rim of the rollers 161, 162 during operation. The axle narrow central portion 167 has a clearance fit (i.e., the operating slot 176 is slightly wider than the axle narrow central portion 167, while the installation slot 177 may be smaller than or about the same width as the axle narrow central portion 167), allowing the axle to slide towards the tip 179 of the mounting arm within the slot 176 when the mounting arm 172 is inverted. However, during operation, when the mounting arm 172 is located beneath a sprocket and conveyor belt to place the rollers 161, 162 into an operating position near the conveyor belt, the axle 163 remains in the operating position of FIG. 14.

Figure 15:
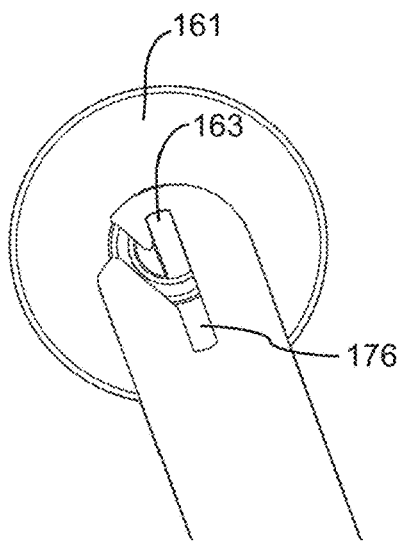
FIG. 15 shows the roller portion of FIG. 11 in a cleaning position.

FIG. 15 shows the axle narrow central portion 163 in a cleaning position within the slot 176. The axle 163 can slide through the operating slot 176 to allow access to the slot faces for cleaning, the axle 163 can easily slide back into the operating position shown in FIG. 14, without easily entering into the installation slot 177.

Figure 16:
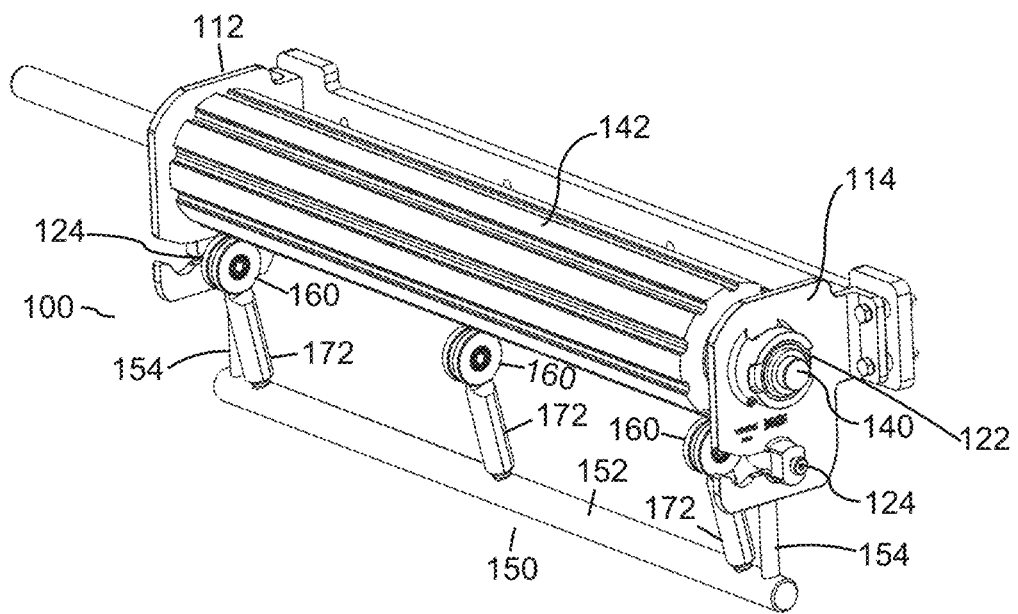
FIG. 16 is an isometric view of a drive end of a low-tension, direct drive conveyor belt system including the roller limiter of FIG. 5 in a position limiter assembly designed to accommodate flights in a conveyor belt according to an embodiment.
Figure 17:
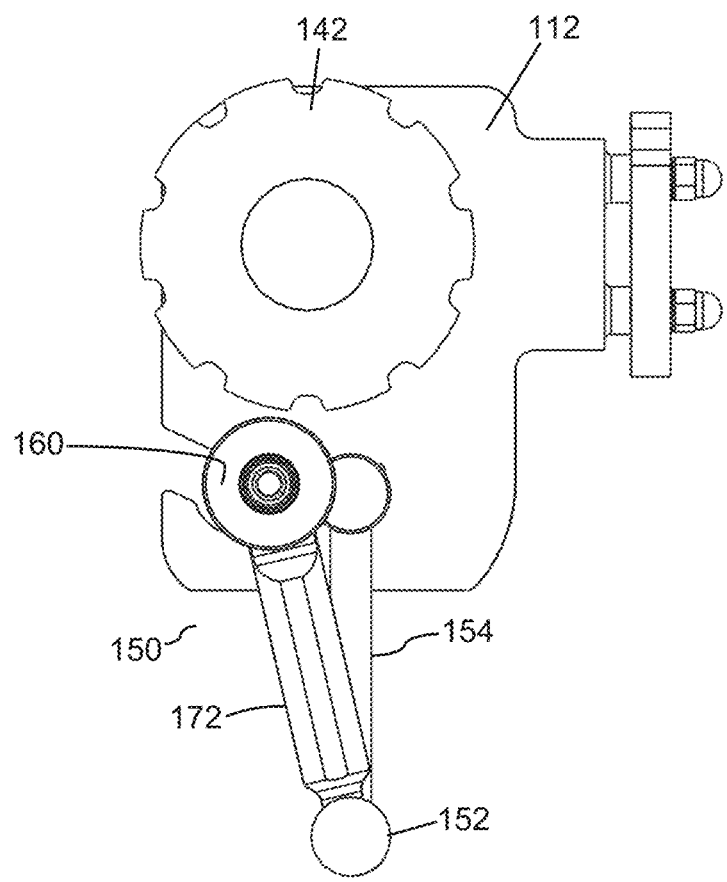
FIG. 17 is a side view of the drive end of FIG. 16.
Figure 18:
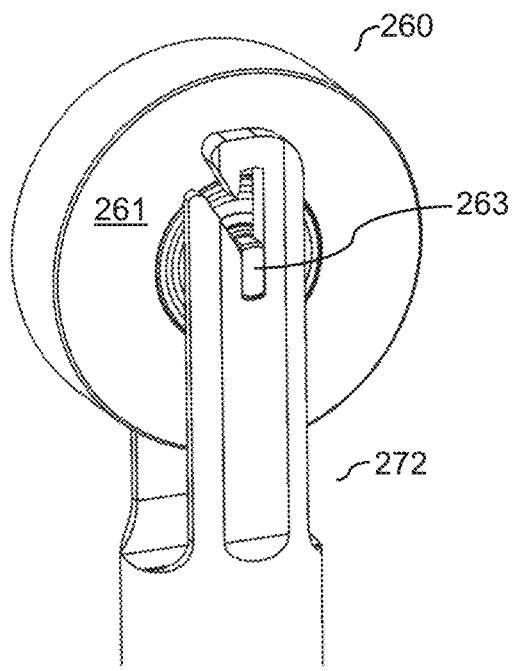
FIG. 18 is an isometric view of a roller and mounting arm for a position limiter assembly according to another embodiment of the invention.
Figure 19:
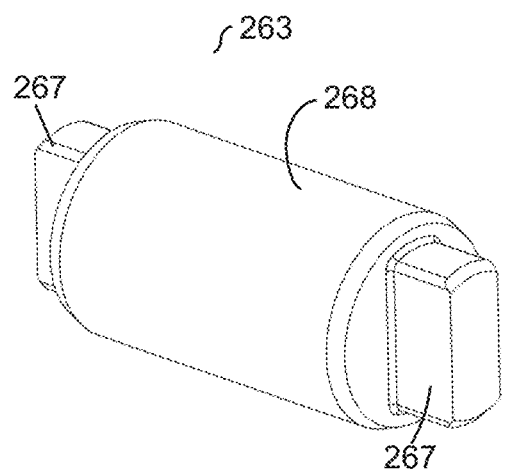
FIG. 19 is an isometric view of the axle of the roller of FIG. 18.
Figure 20:
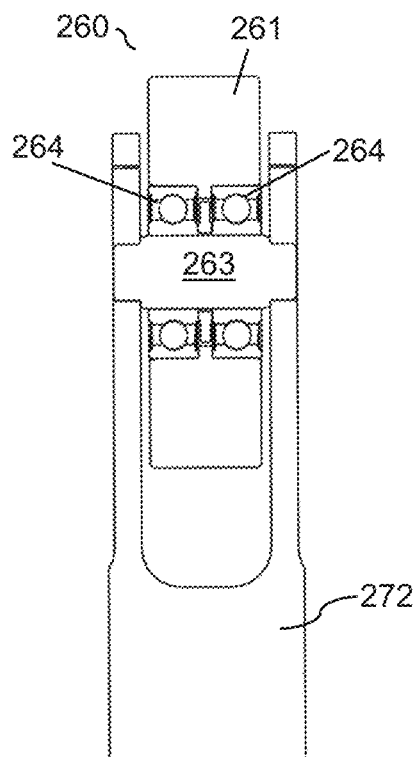
FIG. 20 is a cross-sectional view of the assembly of FIG. 18.
Figure 21:
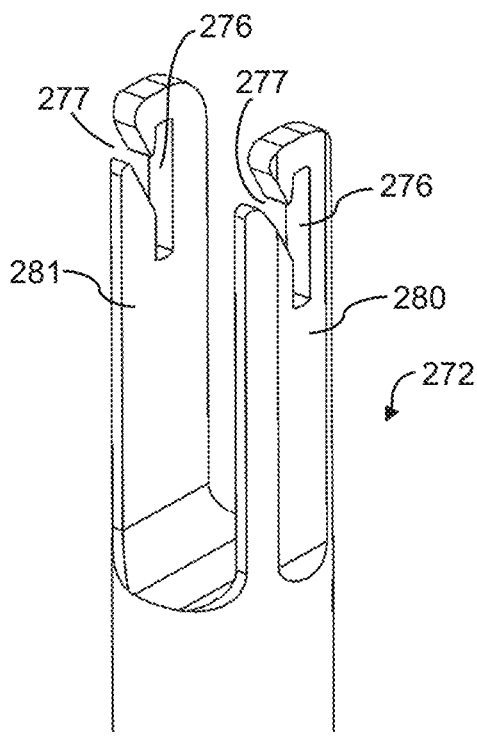
FIG. 21 is an isometric view of the end portion of the mounting arm of FIG. 18.

FIGS. 16 and 17 show a drive end of a low-tension, direct drive conveyor belt system 100 including a position limiter assembly 150 including the double roller design shown in FIGS. 5-15. The illustrative position limiter assembly 150 includes a plurality of double roller position limiters 160 mounted to a mounting bar 152 using mounting arms 172. The double roller position limiters 160 are spaced apart to accommodate flights in a conveyor belt according to one embodiment of the invention. The illustrative drive end assembly 100 includes a pair of spaced apart, opposing end plates 112, 114 for mounting various components and forming a drive end of a conveyor. Each end plate includes an upper opening 122 with an integrated bearing for receiving a drive shaft 140, on which a full-width sprocket1 142 or other conveyor drive is mounted.

The position limiter assembly 150 includes assembly mounting arms 154 at the ends of the mounting bar 152 for placing the position limiters 160 in an operating position relative to the sprocket 142. The end plates 112, 114 include lower openings 124 for configured to receive a connecting portion of the mounting arms 154, as described above. As shown in FIG. 17, the roller mounting arms 172 and assembly mounting arms 154 extend at an angle relative to each other, so that when the assembly mounting arms 154 hang vertically, the roller mounting arms 172 extend slightly forward at an angle between about 10° and about 30°, and preferably between about 15° and about 25°, to properly position the rollers 160 relative to the sprocket 142 or other drive means.

In another embodiment, shown in FIGS. 18-21, a roller limiter 260 includes a single roller 261 mounted on an axle 263 using bearings 264. The roller 261 is mounted to a roller mounting arm 272 to integrate the roller 261 with a position limiter assembly. The axle, shown in FIG. 17, includes a central roller-mounting portion 268 and two flat-sided protrusions 267. The illustrative mounting arm 272 includes a pair of spaced-apart fingers 280, 281 for rotatably receiving the roller 261 therebetween. Each finger 280, 281 include a first slot 276 and a second slot 277 that intersects the first slot at an angle and is open. The first slot 276 forms an operation slot for the axle and the second slot 277 forms an installation slot, similar to the operation slot 176 and installation slot 277 described above. The position limiter 260 can be mounted to the mounting arm 272 by orienting the axle protrusions 267 and pushing them through the second slot 277, then rotating the protrusions 267 and allowing them to fall into operating position in the first slot 276. Other suitable means for mounting a roller forming a position limiter to a mounting member may be used.

In one embodiment, shown in FIG. 22, a roller mounting arm 372 for mounting a roller to a position limiter assembly may include a relief slot 379, in addition to an operation slot 376 and an insertion slot 377 intersecting the operation slot at an angle. The relief slot allows the upper portion 375 to have more flexibility, facilitating larger interferences and increased tolerance on the slot width. The relief slot 379 may also protect against permanent deformation of the upper portion of the insertion slot 377.

In another embodiment, shown in FIG. 23, a roller mounting arm 472 for mounting a roller to a position limiter assembly may include an operation slot 476 that has a large chamfer 479 in an upper portion to facilitate cleaning of an axle of the roller when in a cleaning position.

Other modifications to facilitate hygiene may also be used. For example, as shown in FIGS. 24 and 25, a mounting arm 572 for mounting a roller to a position limiter assembly may include an upper portion that tapers in thickness to facilitate cleaning of a roller axle 563 when a roller limiter 560 is in a cleaning position in an operation slot 576 of the mounting arm 572. The reduces thickness of the upper portion 575 around the upper portion of the operation slot 576 exposes the axle 563 when the axle travels into the upper portion to facilitate cleaning of the axle 563.

The scope of the claims is not meant to be limited to the details of the described exemplary embodiments.

What is claimed is:

1. A position limiter assembly for a conveyor, comprising:
a mounting bar extending from a first end to a second end;
a mounting portion for mounting the mounting bar to a conveyor frame;
a plurality of roller mounting arms extending from the mounting bar at selected intervals along the length of the mounting bar, each roller mounting arm comprising a base and a slotted end; and
a roller assembly mounted to each roller mounting arm, each roller assembly comprising a pair of spaced-apart rollers rotatably mounted on an axle, the axle including roller mounting portions allowing free rotation of the rollers and a narrow central portion having flat sides configured to be received in the slotted end of an associated roller mounting arm.

2. The position limiter assembly of claim 1, wherein the slotted end includes an operation slot and an open installation slot intersecting the operation slot at an angle.

3. The position limiter assembly of claim 2, wherein the slotted end further includes a relief slot intersecting the operation slot.

4. The position limiter assembly of claim 3, wherein the operation slot has a chamfer.

5. The position limiter of claim 1, wherein the slotted end is thinner than the base of the roller mounting arm.

6. The position limiter assembly of claim 1, wherein each roller mounting arm includes a threaded end opposite the slotted end configured to be received in a corresponding opening in the mounting bar.

7. The position limiter assembly of claim 1, wherein the mounting portion comprises:
a first assembly mounting arm extending from the mounting bar at the first end, and
a second assembly mounting arm extending from the mounting bar at a second end.

8. The position limiter assembly of claim 7, wherein each assembly mounting arm including a vertical neck, a cylindrical head and a boss extending outward from the cylindrical head for connecting the position limiter assembly to the conveyor frame.

9. The position limiter assembly of claim 7, wherein the roller mounting arms extend at an angle of between about 10° and about 30° relative to the assembly mounting arm.

10. A roller limiter for a conveyor belt, comprising:
a mounting arm having a base extending from a threaded end to a slotted end, the base end including an operation slot and an open installation slot intersecting the operation slot at an angle; and
a roller assembly mounted to the slotted end, wherein the roller assembly comprises a pair of spaced-apart rollers rotatably mounted on an axle, the axle including roller mounting portions allowing free rotation of the rollers and a narrow central portion having flat sides configured to be received in the slotted end of the mounting arm.

11. The roller limiter of claim 10, wherein the slotted end further includes a relief slot intersecting the operation slot.

12. A roller limiter for a conveyor belt, comprising:
a mounting arm having a base extending from a threaded end to a slotted end, the slotted end comprising a pair of spaced-apart fingers; and
a roller assembly mounted between the pair of spaced-apart fingers, the roller assembly comprising an axle having a central roller-mounting portion and two flat-side protrusions received in slots in the fingers and roller mounted on the central roller-mounting portion using bearings.

13. The roller limiter of claim 12, wherein each finger include an operation slot and an installation slot that intersects the operation slot at an angle and is open.

14. The roller limiter of claim 13, wherein each finger further includes a relief slot intersecting the operation slot.

* * * * *